(12) United States Patent
Xing

(10) Patent No.: US 12,490,201 B2
(45) Date of Patent: Dec. 2, 2025

(54) INFORMATION INDICATING METHOD, APPARATUS, DEVICE AND STORAGE MEDIUM

(71) Applicant: GUANGDONG OPPO MOBILE TELECOMMUNICATIONS CORP., LTD., Guangdong (CN)

(72) Inventor: Jinqiang Xing, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 548 days.

(21) Appl. No.: 17/956,770

(22) Filed: Sep. 29, 2022

(65) Prior Publication Data

US 2023/0026289 A1 Jan. 26, 2023

Related U.S. Application Data

(63) Continuation of application No. PCT/CN2020/082542, filed on Mar. 31, 2020.

(51) Int. Cl.
*H04W 52/24* (2009.01)

(52) U.S. Cl.
CPC ................. *H04W 52/243* (2013.01)

(58) Field of Classification Search
CPC ............. H04W 52/24; H04W 52/243
See application file for complete search history.

(56) References Cited

U.S. PATENT DOCUMENTS

| | | | | |
|---|---|---|---|---|
| 9,078,217 | B2 * | 7/2015 | Ishii | H04W 52/367 |
| 9,491,708 | B2 * | 11/2016 | Jung | H04W 52/367 |
| 9,894,678 | B2 * | 2/2018 | Tejedor | H04W 72/535 |
| 9,992,784 | B2 * | 6/2018 | Chen | H04W 16/02 |
| 10,123,278 | B2 * | 11/2018 | Ramkumar | H04W 52/367 |
| 10,201,011 | B2 * | 2/2019 | Wang | H04W 16/14 |
| 10,251,138 | B2 * | 4/2019 | Takahashi | H04W 52/36 |

(Continued)

FOREIGN PATENT DOCUMENTS

| | | | |
|---|---|---|---|
| CN | 102076095 | A | 5/2011 |
| CN | 102547954 | A | 7/2012 |

(Continued)

OTHER PUBLICATIONS

The Extended European Search Report of corresponding European application No. 20929115.2, dated Apr. 14, 2023.

(Continued)

*Primary Examiner* — Hai V Nguyen

(74) *Attorney, Agent, or Firm* — Ladas & Parry, LLP

(57) ABSTRACT

An information indicating method, apparatus, device and storage medium, which relates to the field of communication. The method includes: sending, by a terminal device, indication information to a network device, where the indication information is used to indicate an additional out-of-band radiation requirement supported by the terminal device (402). By sending the indication information from the terminal device to the network device, the network device can determine the additional out-of-band radiation requirement supported by the terminal device, so as to configure a reasonable cell to the terminal device, and avoid a problem of a cell access failure when the terminal device does not support the additional out-of-band radiation requirement.

17 Claims, 5 Drawing Sheets

(56) References Cited

U.S. PATENT DOCUMENTS

| | | | | |
|---|---|---|---|---|
| 10,517,050 | B2* | 12/2019 | Nguyen | H04W 52/36 |
| 11,463,962 | B2* | 10/2022 | Sutskover | H04W 52/146 |
| 11,683,838 | B2* | 6/2023 | Kim | H04W 16/18 |
| | | | | 370/329 |
| 11,711,120 | B1* | 7/2023 | Sverdlov | H04B 7/0639 |
| | | | | 375/262 |
| 11,716,696 | B2* | 8/2023 | Takahashi | H04W 52/367 |
| | | | | 455/522 |
| 11,856,533 | B2* | 12/2023 | Yang | H04L 27/2636 |
| 12,028,813 | B2* | 7/2024 | Sun | H04W 52/365 |
| 12,041,665 | B2* | 7/2024 | Kim | H04L 1/18 |
| 2008/0181333 | A1* | 7/2008 | Jiang | H04L 27/2614 |
| | | | | 375/317 |
| 2012/0044898 | A1* | 2/2012 | Ishii | H04W 52/42 |
| | | | | 370/329 |
| 2014/0171001 | A1* | 6/2014 | Fernando | H04B 17/21 |
| | | | | 455/226.1 |
| 2014/0192848 | A1* | 7/2014 | Rao | H04L 27/2634 |
| | | | | 375/219 |
| 2014/0248889 | A1 | 9/2014 | Van Lieshout et al. | |
| 2015/0223111 | A1 | 8/2015 | Lindoff et al. | |
| 2015/0282093 | A1* | 10/2015 | Kaukovuori | H04W 52/367 |
| | | | | 370/311 |
| 2015/0351054 | A1* | 12/2015 | Immonen | H04W 52/243 |
| | | | | 370/311 |
| 2016/0095055 | A1* | 3/2016 | Sarrigeorgidis | H04B 1/525 |
| | | | | 370/311 |
| 2016/0262171 | A1* | 9/2016 | Tejedor | H04W 72/535 |
| 2017/0041950 | A1 | 2/2017 | Wang et al. | |
| 2017/0048809 | A1* | 2/2017 | Takahashi | H04W 52/40 |
| 2017/0111914 | A1 | 4/2017 | Chen et al. | |
| 2019/0174286 | A1 | 6/2019 | Guo et al. | |
| 2021/0400595 | A1* | 12/2021 | Sutskover | H04W 52/226 |

FOREIGN PATENT DOCUMENTS

| | | | | |
|---|---|---|---|---|
| CN | 103813347 | A | | 5/2014 |
| CN | 104125603 | A | | 10/2014 |
| CN | 104144447 | A | | 11/2014 |
| CN | 104718772 | A | | 6/2015 |
| CN | 106233813 | A | | 12/2016 |
| EP | 2749081 | B1* | 3/2010 | H04W 72/21 |
| JP | 2010-279018 | A | | 12/2010 |
| WO | WO-2016056556 | A1* | 4/2016 | H04W 52/367 |
| WO | 2020-246185 | A1 | | 12/2020 |
| WO | 2021196001 | A1 | | 10/2021 |

OTHER PUBLICATIONS

Moderator (Qualcomm Incorporated), "Email discussion summary for RAN4#94e_#4_NR_NewRAT_UE_RF", R4-2002876, 3GPP TSG-RAN WG4 Meeting #94-e, Electronic Meeting, Feb. 24-Mar. 6, 2020.

Ericsson:"Introduction of the Annex modified MPR-Behaviour into the NR SA specification",3GPP Draft; R4-2001308,3rd Generation Partnership Project (3GPP), Mobile Competence Centre; 650, Route Des Lucioles;F-06921 Sophia-Antipolis Cedex; France, vol. RAN WG4, No. Electronic meeting; Feb. 24, 2020-Mar. 6, 2020, Feb. 14, 2020(Feb. 14, 2020), XP051851238, all pages.

The first Office Action and search report of corresponding Chinese application No. 202111109135.8, dated Mar. 8, 2023.

The second Office Action of corresponding Chinese application No. 202111109135.8, dated May 26, 2023.

The second Office Action of corresponding Japanese patent application No. 2022-560147, dated Apr. 23, 2024.

The second Office Action of corresponding European application No. 20929115.2, dated Mar. 15, 2024.

The first Office Action of corresponding Indian application No. 202217061973, dated Jan. 17, 2024.

The first Office Action of corresponding European application No. 20929115.2, dated Sep. 27, 2023.

The first Office Action of corresponding Japanese application No. 2022-560147, dated Dec. 5, 2023.

NTT Docomo, Inc, "The necessity of UE capability signalling on NS value", R4-1914128, 3GPP TSG RAN WG4 Meeting #93, Reno, US, Nov. 18-22, 2019.

International Search Report (ISR) dated Jan. 4, 2021 for Application No. PCT/CN2020/082542, and its English Translation provided by WIPO.

Written Opinion (WOSA) dated Jan. 4, 2021 for Application No. PCT/CN2020/082542, and its English Translation provided by Google Translate.

3rd Generation Partnership Project;Technical Specification Group Radio Access Network;NR;User Equipment (UE) radio transmission and reception;Part 1: Range 1 Standalone(Release 15) 3GPP TS 38.101-1 V15.0.0 (Dec. 2017), all pages.

The Hearing Notice of corresponding India patent application No. 202217061973, dated Jan. 23, 2025.

* cited by examiner

INFORMATION INDICATING METHOD, APPARATUS, DEVICE AND STORAGE MEDIUM

CROSS-REFERENCE TO RELATED APPLICATIONS

This application is a continuation of International Application No. PCT/CN2020/082542 filed on Mar. 31, 2020, the content of which is incorporated herein by reference in its entirety.

TECHNICAL FIELD

The present application relates to the field of wireless communication, and in particular, to an information indicating method, apparatus, device and storage medium.

BACKGROUND

When a terminal device transmits a signal, it should not only meet a power requirement on a transmission channel, but also meet a corresponding out-of-band radiation requirement in order to avoid interference to other users.

The "out-of-band radiation requirement" herein usually refers to a leakage signal of the terminal device in a spectrum range beyond its allocated channel bandwidth. If this part of signal is too large, it will cause interference to other communication devices. Therefore, regulatory agencies of various countries or regions have strict requirements for this. If the terminal device can't meet the out-of-band radiation requirement, it cannot transmit signals.

SUMMARY

Embodiments of the present application provides an information indicating method, apparatus, device and storage medium, which can solve a problem that a cell access failure may occur when a terminal device does not support some additional out-of-band radiation requirements. Technical solutions are as follows.

According to one aspect of the present application, an information indicating method is provided, the method includes:

sending, by a terminal device, indication information to a network device, where the indication information is used to indicate an additional out-of-band radiation requirement supported by the terminal device.

According to one aspect of the present application, an information indicating method is provided, the method includes:

receiving, by a network device, indication information from a terminal device, where the indication information is used to indicate an additional out-of-band radiation requirement supported by the terminal device.

According to one aspect of the present application, a terminal device is provided, the terminal device includes: a processor; a transceiver connected with the processor; a memory used to store an executable instruction of the processor; where the processor is configured to load and execute the executable instruction to implement the information indicating method as described in the above aspects.

According to one aspect of the present application, a network device is provided, the network device includes: a processor; a transceiver connected with the processor; a memory used to store an executable instruction of the processor; where the processor is configured to load and execute the executable instruction to implement the information indicating method as described in the above aspects.

According to one aspect of the present application, a computer-readable storage medium is provided, where an executable instruction is stored in the computer-readable storage medium, and the executable instruction is loaded and executed by a processor to implement the information indicating method as described in the above aspects.

The technical solutions provided by the embodiments of the present application at least include the following beneficial effects:

by sending the indication information from the terminal device to the network device, the network device can determine the additional out-of-band radiation requirement supported by the terminal device, so as to configure a reasonable cell to the terminal device, and avoid a problem of a cell access failure when the terminal device does not support the additional out-of-band radiation requirement.

BRIEF DESCRIPTION OF DRAWINGS

In order to explain the technical solution in the embodiments of the present application more clearly, the following will briefly introduce the accompanying drawings needed in the description of the embodiments. It is obvious that the accompanying drawings in the following description are only some embodiments of the present application. For those skilled in the art, other accompanying drawings can be obtained based on these accompanying drawings without paying creative work.

DESCRIPTION OF EMBODIMENTS

In order to make objectives, technical solutions and advantages of the present application clearer, the implementations of the present application will be further described in detail in combination with the accompanying drawings.

Figure 1:
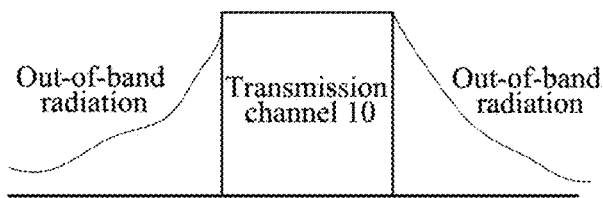
FIG. 1 is a schematic diagram of out-of-band leakage according to an exemplary embodiment of the present application.

Out-of-band radiation (OOB radiation) requirement: (also known as out-of-band leakage requirement, out-of-band leakage index) when a terminal device transmits a signal, it should not only meet a power requirement on a transmission channel 10, but also meet a corresponding out-of-band radiation requirement in order to avoid interference to other communication devices, as shown in FIG. 1. The out-of-band radiation requirement includes: a general out-of-band radiation requirement and an additional out-of-band radiation requirement.

General out-of-band radiation requirement: is a basic out-of-band radiation requirement that a terminal device needs to meet during designing, and is suitable for most frequency bands.

Additional out-of-band radiation (additional out-of-band radiation or additional spectrum emission) requirement: is an out-of-band radiation requirement extra formulated by a country or a region for a specified frequency band based on a general out-of-band radiation requirement. The additional out-of-band radiation requirement is usually more stringent than the general out-of-band radiation requirement.

That is to say, the out-of-band radiation signal will not only interfere with other communication devices in a current communication system, but also interfere with other communication systems (such as navigation, satellite, private network, etc.) adjacent to the spectrum. In order to avoid this potential interference, different countries or regions will define a multi-network coexistence scenario that may have interference, and formulate the additional out-of-band radiation requirement based on the general out-of-band radiation requirement.

Figure 2:
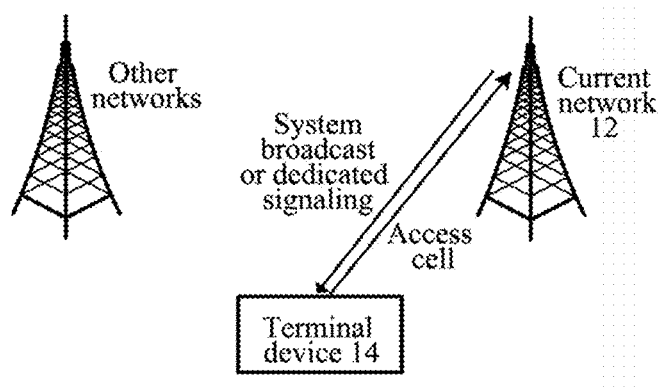
FIG. 2 is a schematic diagram of a cell access failure according to an exemplary embodiment of the present application.

As shown in FIG. 2, in the multi-network coexistence scenario, the additional out-of-band radiation requirement is informed to a terminal device 14 by a current network 12 through system broadcast or dedicated signaling. When the terminal device 14 can meet the additional out-of-band radiation requirement, it can perform signal transmission and then access a corresponding cell; when the terminal device 14 does not meet the additional out-of-band radiation requirement, the cell is regarded as an access forbidden (bar) state in the multi-network coexistence scenario, and will not access the cell.

The above multi-network coexistence scenario and the corresponding additional out-of-band radiation requirement are defined in the third generation partnership project (3GPP) according to a frequency band. The following Table 1 shows an 8-bit bitmap, each bit represents a different out-of-band leakage index requirement in a corresponding frequency band.

TABLE 1

| Frequency band | Additional out-of-band radiation requirement | | | | | | | |
|---|---|---|---|---|---|---|---|---|
| | 0 | 1 | 2 | 3 | 4 | 5 | 6 | 7 |
| n1 | NS_01 | NS_100 | NS_05 | NS_05U | | | | |
| n2 | NS_01 | NS_100 | NS_03 | NS_03U | | | | |
| n3 | NS_01 | NS_100 | | | | | | |
| | | ... | | | | | | |

For example, additional out-of-band radiation requirements such as NS_05, NS_05U, and NS_100 are defined for frequency band n1, where each network signal (NS) value herein represents a corresponding additional out-of-band radiation requirement. For a terminal, it is mandatory to meet the requirement. However, with deployments of different systems in different countries or regions, a new multi-network interference coexistence scenario will be found from time to time, and a corresponding additional out-of-band radiation requirement need to be defined, and then adding 3GPP becomes a mandatory requirement for the terminal to support.

The technical problem of the above technical solution is that: assuming that a new additional out-of-band radiation requirement NS_X is introduced for the above n1 frequency band, then for the terminal device that has been listed before, it does not recognize this newly-defined additional out-of-band radiation requirement NS_X. If a base station configures a cell of the n1 frequency band to the terminal device, and the base station broadcasts the additional out-of-band radiation requirement NS_X, then the terminal device will consider this cell to be in a bar state for the reason that the terminal device itself does not support the additional out-of-band radiation requirement NS_X, and then a cell configuration failure occurs.

An embodiment of the present application provides a technical solution to avoid the above problem, that is, the technical problem that a cell access failure may occur when the terminal device does not support some additional out-of-band radiation requirements.

Figure 3:
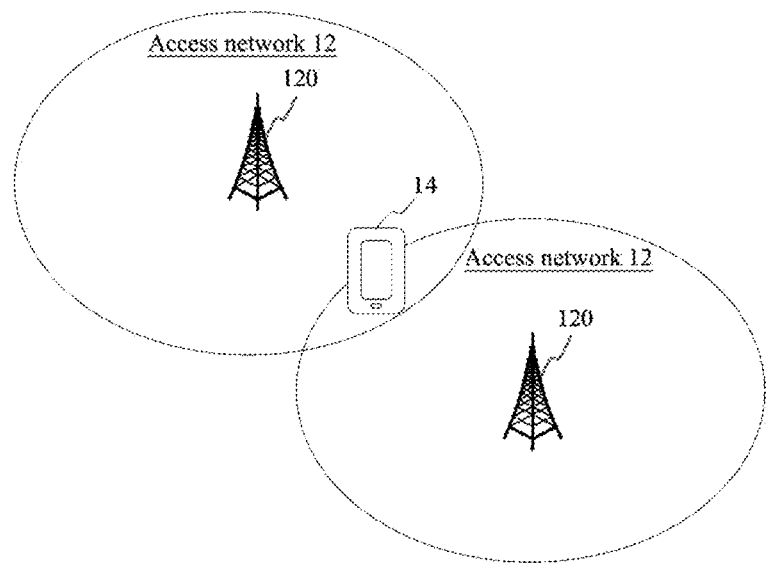
FIG. 3 is a block diagram of a communication system according to an exemplary embodiment of the present application.

FIG. 3 shows a block diagram of a communication system according to an exemplary embodiment of the present application, the communication system may include: an access network 12 and a terminal device 14.

The access network 12 includes a plurality of network devices 120. The network device 120 may be a base station, which is an apparatus deployed in an access network to provide wireless communication functions for a terminal device. The base station can include various forms of macro base stations, micro base stations, relay stations, access points and so on. In systems using different wireless access technologies, names of devices with base station function may be different. For example, in LTE system, it is called eNodeB or eNB; in 5G (5th Generation) NR-U (New Radio in Unlicensed Spectrum) system, it is called gNodeB or gNB. With an evolution of communication technology, a description of "base station" may change. For the ease of the embodiments of the present application, the above apparatuses that provide wireless communication function for the terminal device 14 are collectively referred to as network devices.

The terminal device 14 may include various handheld devices, vehicle mounted devices, wearable devices, computing devices, which have a wireless communication function or other processing devices connected to a wireless modem, as well as various forms of user equipment, mobile stations (MSs), terminal devices, and the like. For the ease of description, the above devices are collectively referred to as terminal devices. The network device 120 and the terminal device 14 communicate with each other through a certain air interface technology, such as a Uu Interface.

The technical solution of the embodiment of the present application can be applied to various communication systems, such as: Global System of mobile communication (GSM) system, Code Division Multiple Access (CDMA) system, Wideband Code Division Multiple Access (WCDMA) system, General Packet Radio Service (GPRS), Long Term Evolution (LTE) system, Frequency Division Duplex (FDD) system, Time Division Duplex (TDD) system, Advanced long term evolution (LTE-A) system, New Radio (NR) system, evolution system of a NR system, LTE-based access to unlicensed spectrum (LTE-U), NR-U system, Universal Mobile Telecommunication System (UMTS), and Worldwide Interoperability for Microwave Access (WiMAX) communication system, Wireless Local Area Network (WLAN), Wireless Fidelity (WiFi), and next generation communication system or other communication systems.

Generally speaking, traditional communication systems support a limited number of connections and are easy to implement. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication and Vehicle to everything (V2x) system. The embodiments of the present application can also be applied to these communication systems.

Figure 4:
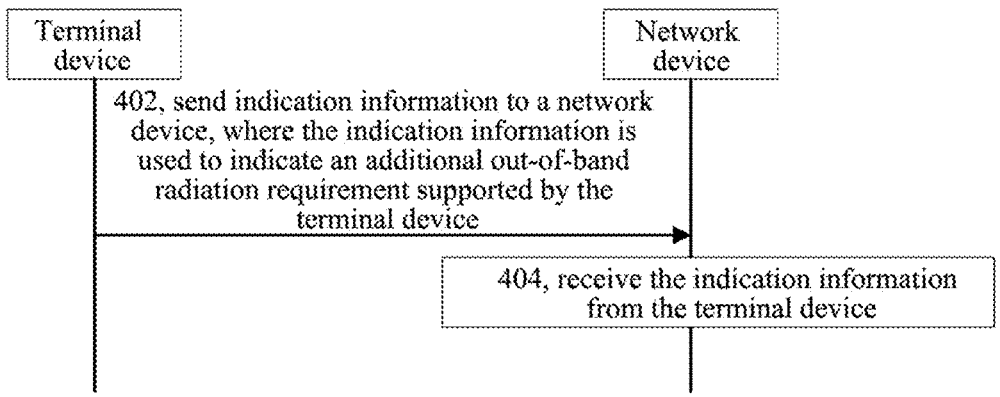
FIG. 4 is a flow chart of an information indicating method according to an exemplary embodiment of the present application.

FIG. 4 shows a flow chart of an information indicating method according to an exemplary embodiment of the present application. This method can be applied to the communication system shown in FIG. 3. The method includes:

step 402, a terminal device sends indication information to a network device, where the indication information is used to indicate an additional out-of-band radiation requirement supported by the terminal device; and step 404, the network device receives the indication information from the terminal device.

In an embodiment, the network device determines one or more additional out-of-band radiation requirements supported by the terminal device according to the indication information. The network device configures an accessible cell to the terminal device according to the one or more additional out-of-band radiation requirements supported by the terminal device.

In conclusion, in the method provided by the embodiment, by sending the indication information from the terminal device to the network device, the network device can determine the additional out-of-band radiation requirement supported by the terminal device, so as to configure a reasonable cell to the terminal device, and avoid a problem of a cell access failure when the terminal device does not support the additional out-of-band radiation requirement.

There are at least three different implementation solutions for the above embodiment.

Mode 1: the terminal device actively reports the indication information to the network device.

Mode 2, the network device sends an inquiry request to the terminal device, and the terminal device sends an inquiry feedback to the network device, and the inquiry feedback carries the indication information.

Mode 3: when a cell access failure occurs, the terminal device reports the indication information in a failure reason value.

Figure 5:
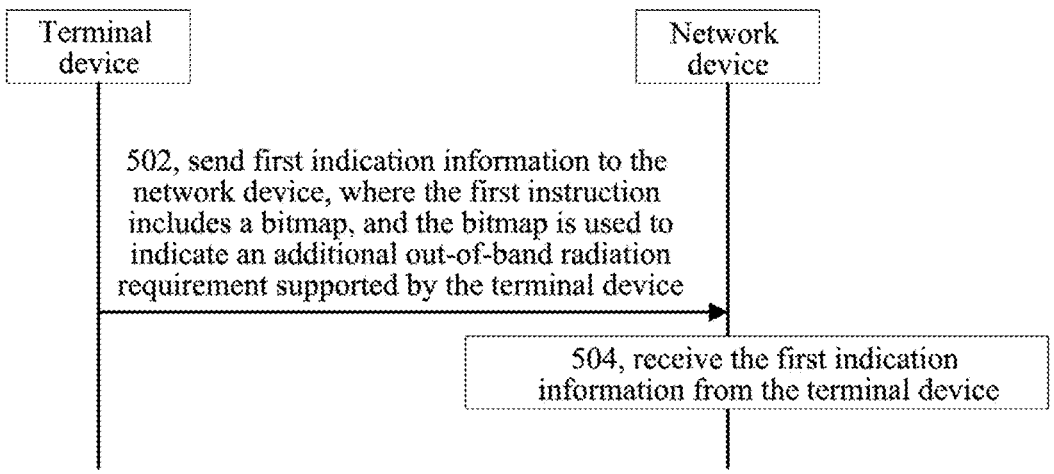
FIG. 5 is a flow chart of an information indicating method according to an exemplary embodiment of the present application.

For the above mode 1:

FIG. 5 shows a flow chart of an information indicating method according to another exemplary embodiment of the present application. This method can be applied to the communication system shown in FIG. 3. The method includes:

step 502, the terminal device sends first indication information to the network device, where the first instruction includes a bitmap, and the bitmap is used to indicate an additional out-of-band radiation requirement supported by the terminal device.

In an embodiment, the bitmap contains n bits, and each bit corresponds to an additional out-of-band radiation requirement. That is, n bits correspond to n additional out-of-band radiation requirements one-to-one. When a value of a bit is a first value, it means that the terminal device supports a additional out-of-band radiation requirement corresponding to the bit; when the value of the bit is a second value, it means that the terminal device does not support the additional out-of-band radiation requirements corresponding to the bit.

Exemplary, the first value is 1 and the second value is 0. Or, the first value is 0 and the second value is 1.

Exemplary, a report format can be shown in Table 2 below (taking 8 bits as an example), and a Network Signaling (NS) value supported by the terminal device on frequency band A is indicated by a bitmap. If the terminal device supports an additional out-of-band radiation requirement of a current type, a corresponding bit is set to 1, otherwise it is set to 0. A specific network signaling value represented by each bit and the corresponding additional out-of-band radiation requirement can be defined by a pre-defined method or being directly corresponded to a specific table in 3GPP standard.

For example, terminal device 1 is a terminal device before a Network Signaling value NS_X is introduced into the 3GPP standard and the NS_X is not supported, then a network signaling capability reported on the frequency band A is 11110000. For terminal device 2, it is a terminal device after the Network Signaling value NS_X is introduced into the 3GPP standard, then a network signaling capability reported by terminal device 2 on the frequency band A is 11111000.

TABLE 2

| NR frequency band | Additional out-of-band radiation requirement | | | | | | | |
|---|---|---|---|---|---|---|---|---|
| | 0 | 1 | 2 | 3 | 4 | 5 | 6 | 7 |
| Frequency Band A | NS_a | NS_b | NS_c | NS_d | NS_X | | | |

In an embodiment, the first indication information is carried in a Radio Resource Control (RRC) signaling.

Step 504, the network device receives the first indication information from the terminal device.

In an embodiment, in the RRC signaling received by the network device from the terminal device, the RRC signaling carries the first indication information, and the first indication information includes a bitmap, and the bitmap is used to indicate the additional out-of-band radiation requirement supported by the terminal device.

In an embodiment, the network device determines one or more additional out-of-band radiation requirements supported by the terminal device according to the first indication information. The network device configures an accessible cell to the terminal device according to the one or more additional out-of-band radiation requirements supported by the terminal device.

In conclusion, the method provided by the embodiment represents the additional out-of-band radiation requirement supported by the terminal device through the bitmap. Since the number of bits required by the bitmap is less, thus the overhead of air interface resources can be saved.

Figure 6:
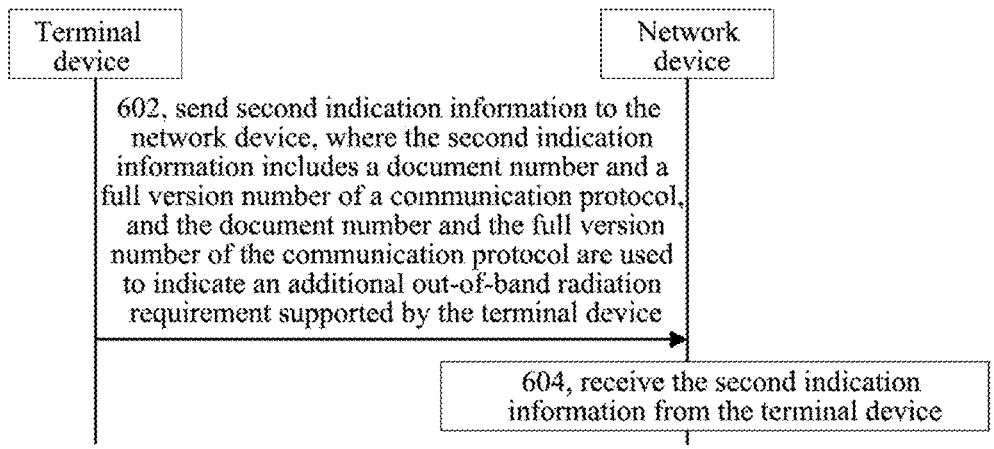
FIG. 6 is a flow chart of an information indicating method according to an exemplary embodiment of the present application.

FIG. 6 shows a flow chart of an information indicating method according to another exemplary embodiment of the present application. This method can be applied to the communication system shown in FIG. 3. The method includes:

step 602, the terminal device sends second indication information to the network device, where the second indication information includes a document number and a full version number of a communication protocol, and the document number and the full version number of the communication protocol are used to indicate an additional out-of-band radiation requirement supported by the terminal device.

In an embodiment, the terminal device informs the base station of the additional out-of-band radiation requirement that it can meet by reporting the document number and full version number of the communication protocol supported by the terminal device.

Because after the terminal device is designed and produced, a 3GPP protocol version that the terminal device can support is clear, such as 38.101-1 v15.7.0 protocol version, then the terminal device will meet a corresponding additional out-of-band radiation requirement in the protocol version. Among them, 38.101 is a document number, and v15.7.0 is a full version number. The document number includes five digits, first two digits (38) are document serial number, and last three digits (101) are tail number. The full version number includes a released third level version number, V15 is a first level version number, 7 is a second level version number, and 0 is a third level version number.

In related art, the terminal device will only report a document number and a first level version number supported by itself to the network device, such as 3GPP V15 version. The network device cannot know whether the terminal device supports v15.7.0 or v15.8.0, that is, it cannot know a sub-level version number supported by the terminal device. However, the additional out-of-band radiation requirements may be introduced in a 3GPP Standard Version of a certain sub-level version number, such as the additional out-of-band radiation requirements NS_X is introduced in v15.8.0, and for v15.7.0, the additional out-of-band radiation requirement NS_X is not supported. If the terminal device follows a design of v15.7.0, it cannot meet the additional out-of-band radiation requirement NS_X. Suppose that the network device configures the frequency band A for the terminal device and broadcasts a network device signaling relevant to NS_X in the cell, then the terminal device cannot access the cell.

Therefore, the terminal device can also implicitly inform the network device of an additional out-of-band radiation requirement of each frequency band that can be supported by the terminal device by reporting the document number and full version number supported by itself, such as version numbers of 38.101-1, 38.101-2 and 38.101-3. Because the additional out-of-band radiation requirements that need to be met in each frequency band are clearly listed in these communication protocols, after receiving the document number and full version number of the communication protocol satisfied by the terminal device, the network device can know whether there is a need to configure a cell for the terminal device, where the call is located in the frequency band A and broadcasts the additional out-of-band radiation requirement NS_X.

In an embodiment, the second indication information is carried in an RRC signaling. The RRC signaling can be a RRC used to report a wireless access capability of a terminal. The terminal device carries the second indication information in the wireless access capability.

In one example, AccessStratumRFFR1Release is used to represent 38.101-1 specification version number, AccessStratumRFFR2Release is used to represent 38.101-2 specification version number, and AccessStratumRFENDCRelease is used to represent 38.101-3 specification version number. Of course, a plurality of "document number+full version number" can also be reported in one signaling. If there are other needs, other "document number+full version number" can also be reported to the network device together. A corresponding RRC signaling content is as follows:

```
UE-NR-Capability ::=         SEQUENCE {
    ... ...
    accessStratumRFRelease         AccessStratumRFRelease,         OPTIONAL
    ... ...
}
=>
AccessStratumRFRelease ::=         SEQUENCE {
    ... ...
    AccessStratumRFFR1Release      AccessStratumRFFR1Release,      OPTIONAL
    AccessStratumRFFR2Release      AccessStratumRFFR2Release,      OPTIONAL
    AccessStratumRFENDCRelease     AccessStratumRFENDCRelease,     OPTIONAL
    ... ...
}
```

Step 604, the network device receives the second indication information from the terminal device.

In an embodiment, in the RRC signaling received by the network device from the terminal device, the RRC signaling carries the wireless access capability of the terminal, the wireless access capability carries the second indication information, the second indication information includes the document number and the full version number of the communication protocol supported by the terminal device, and the document number and the full version number of the communication protocol are used to indicate the additional out-of-band radiation requirement supported by the terminal device.

In an embodiment, the network device determines one or more additional out-of-band radiation requirements supported by the terminal device according to the second indication information. The network device configures an accessible cell to the terminal device according to the one or more additional out-of-band radiation requirements supported by the terminal device.

In conclusion, the method provided by the embodiment implicitly indicates the additional out-of-band radiation requirements supported by the terminal device through the document number and the full version number. Since one document number and full version number can indicate a variety of additional out-of-band radiation requirements supported by the terminal device at the same time, the number of bits required by the bitmap is less, and thus the overhead of air interface resources can be saved.

Secondly, since the document number and the full version number are carried in the wireless access capability, there is no need to design a new RRC signaling, which can also simplify a system design of the communication system.

Figure 7:
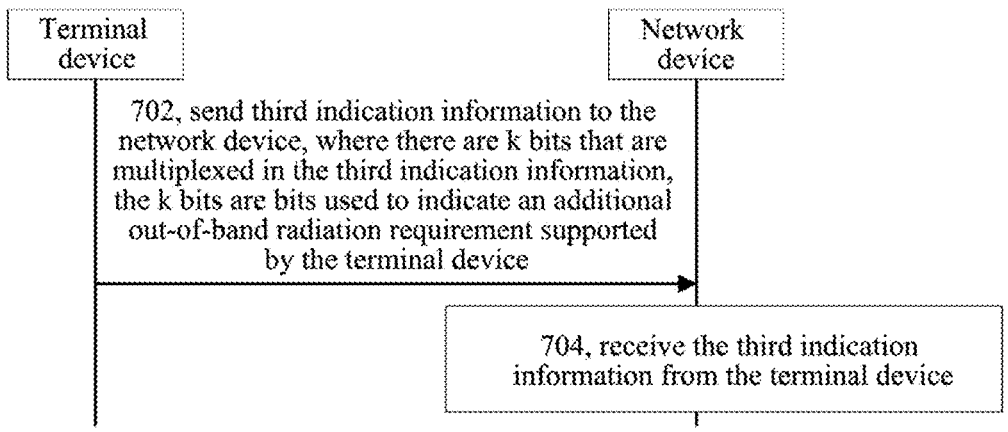
FIG. 7 is a flow chart of an information indicating method according to an exemplary embodiment of the present application.

FIG. 7 shows a flow chart of an information indicating method according to another exemplary embodiment of the present application. This method can be applied to the communication system shown in FIG. 3. The method includes:

step 702, the terminal device sends third indication information to the network device, where there are k bits that are multiplexed in the third indication information, the k bits are bits used to indicate an additional out-of-band radiation requirement supported by the terminal device, and K is a positive integer.

In the released communication protocol, some signaling information bits are defined. These information bits have known indication meaning or reserved bit meaning, but a usage rate of these information bits is low. Among them, "reserved bit meaning" means that a specific indication meaning of the bit that has not been defined in the released communication protocol, and will be defined in a future communication protocol.

The embodiment multiplexes k bits in the third indication information, the k bits are bits used to indicate the additional out-of-band radiation requirement supported by the terminal device, and K is a positive integer.

The third indication information is a signaling with a known meaning, and the k bits are bits with a known meaning (indicating certain information or reserved bits). However, since these k bits are rarely used, they are multiplexed in the embodiment to indicate the additional out-of-band radiation requirement supported by the terminal device.

In an embodiment, the third indication information is a signaling used to report a terminal capability. For example, the third indication information includes a modified Maximum Power Reduction (MPR) behavior (modifiedMPR-Behaviour), in which 8 bits are rarely used for capability reporting. Therefore, the 8 bits in the modifiedMPR-Behavior are multiplexed to extend its meaning to indicate a network signaling value or "document number+full version number" supported by the terminal, so as to inform the network device of a out-of-band leakage requirement supported by the terminal device.

In an embodiment, the k bits that are multiplexed in the third indication information include:
    a first bit in a modifiedMPR-Behaviour signaling, where the first bit is used to indicate a bit used to indicate a modifiedMPR-Behaviour in the modifiedMPR-Behaviour signaling;
    or, all or part of reserved bits in the modifiedMPR-Behaviour signaling, where the reserved bits are bits other than the first bit in the modifiedMPR-Behaviour signaling;
    or, the first bit and all or part of the reserved bits in the modified maximum power reduction MPR behavior signaling.

Exemplary, the modifiedMPR-Behaviour signaling is reported based on a frequency band. That is to say:

For a n41 frequency band, the modifiedMPR-Behaviour signaling defines a meaning of setting 0 or setting 1 at lowest two bit positions, that is, the lowest two bits is the first bit and the remaining six bits are the reserved bits.

For a n71 frequency band, the modifiedMPR-Behaviour signaling defines a meaning of setting 0 or setting 1 at lowest one bit position, that is, the lowest bit is the first bit, and the remaining seven bits are the reserved bits. There is no definition for other frequency bands, and 8 bits are all reserved bits.

In an example, a reporting method in Table 3 below is used for reporting:

TABLE 3

| NR frequency band | Additional out-of-band radiation requirement | | | | | | |
|---|---|---|---|---|---|---|---|
| | 0 | 1 | 2 | 3 | 4 | 5 | 6 | 7 |
| Frequency Band A | Modified MPR-Behaviour | NS_a | NS_b | NS_c | NS_d | NS_X | | |

In an embodiment, taking the frequency band n71 as an example, in Table 3, except the first one bit (the first bit), other bits are reserved bits, and seven reserved bits are used to indicate the additional out-of-band radiation requirement supported by the terminal. When a bit value of the reserved bit is a first value, it means that the terminal device supports an additional out-of-band radiation requirement corresponding to the bit; when the bit value of the reserved bit is a second value, it means that the terminal device does not support the additional out-of-band radiation requirements corresponding to the bit.

Exemplary, the first value is 1 and the second value is 0. Or, the first value is 0 and the second value is 1.

In another example, an eighth bit in the modifiedMPR-Behaviour signaling is used to indicate an indication type of a current modifiedMPR-Behaviour signaling. When a value of the eighth bit is 1 (belonging to a multiplexing indication type), first to seventh bits in the modifiedMPR-Behaviour signaling are used to indicate the additional out-of-band radiation requirement supported by the terminal; when the value of the eighth bit is 0 (not belonging to the multiplexing indication type), the first bit in the modifiedMPR-Behaviour signaling is used to indicate the modifiedMPR-Behaviour, and the remaining second to sixth bits are reserved bits.

In another example, an eighth bit in the modifiedMPR-Behaviour signaling is used to indicate an indication type of a current modifiedMPR-Behaviour signaling. When a value of the eighth bit is 1 (belonging to a multiplex indication type), first to seventh bits in the modifiedMPR-Behaviour signaling are used to indicate the additional out-of-band radiation requirement supported by the terminal; when the value of the eighth bit is 0 (not belonging to the multiplexing indication type), the first bit in the modifiedMPR-Behaviour signaling is used to indicate the modifiedMPR-Behaviour, and the remaining second to sixth bits are used to indicate the additional out-of-band radiation requirement supported by the terminal.

That is to say, the k bits that are multiplexed in the third indication information can be the first bit and all or part of the reserved bit in the modifiedMPR-Behaviour signaling, which is not limited by the embodiment of the present application.

In an embodiment, the modifiedMPR-Behaviour is carried in the RRC signaling, and is a part of UE wireless access capability. The modifiedMPR-Behaviour is included in an information element IE named RF-Parameter (Radio Frequency-Parameter) in the RRC signaling (The IE RF parameters is used to convey RF-related capabilities for NR operation): RF-Parameters→BandNR→modifiedMPR-Behaviour.

Step 704, the network device receives the third indication information from the terminal device.

In an embodiment, the network device receives the third indication information from the terminal device, where there are k bits that are multiplexed in the third indication information, the k bits are bits used to indicate the additional out-of-band radiation requirement supported by the terminal device, and K is a positive integer. In an embodiment, the network device receives an RRC signaling from the terminal device, where the RRC signaling carries the third indication information.

In an embodiment, the k bits that are multiplexed in the third indication information include:
- a first bit in a modifiedMPR-Behaviour signaling, where the first bit is used to indicate a bit used to indicate a modifiedMPR-Behaviour in the modifiedMPR-Behaviour signaling;
- or, all or part of reserved bits in the modifiedMPR-Behaviour signaling, where the reserved bits are bits other than the first bit in the modifiedMPR-Behaviour signaling;
- or, the first bit and all or part of the reserved bits in the modified maximum power reduction MPR behavior signaling.

In an embodiment, the network device determines one or more additional out-of-band radiation requirements supported by the terminal device according to the third indication information. The network device configures an accessible cell to the terminal device according to the one or more additional out-of-band radiation requirements supported by the terminal device.

In conclusion, the method provided by the embodiment indicates the additional out-of-band radiation requirement supported by the terminal device through multiplexing the k bits in the signaling with existing meaning, so it does not need to design a new RRC signaling additionally, which can simplify a system design of the communication system.

Figure 8:
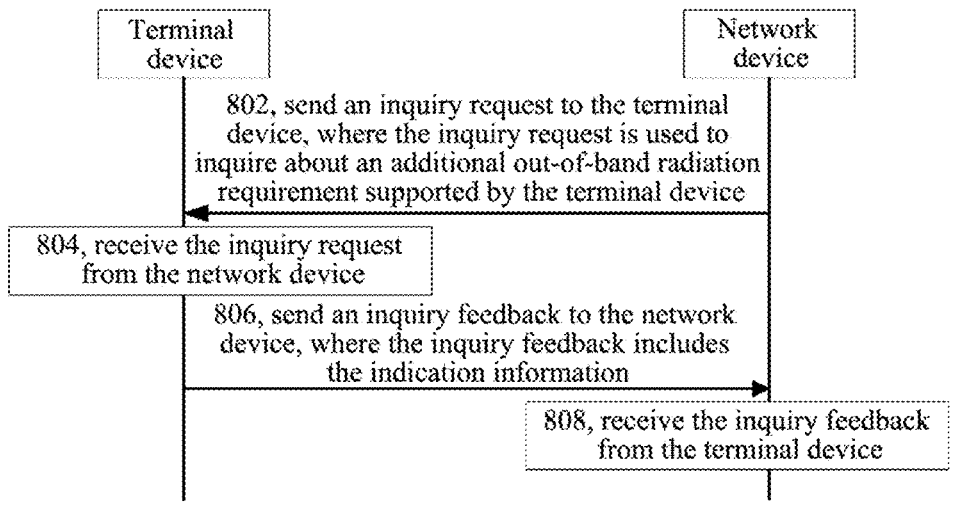
FIG. 8 is a flow chart of an information indicating method according to an exemplary embodiment of the present application.

For the above mode 2:

FIG. 8 shows a flow chart of an information indicating method according to an exemplary embodiment of the present application. This method can be applied to the communication system shown in FIG. 3. The method includes:

step 802, the network device sends an inquiry request to the terminal device, where the inquiry request is used to inquire about an additional out-of-band radiation requirement supported by the terminal device.

In an embodiment, the network device sends the inquiry request to the terminal device before configuring a carrier or a cell to the terminal device.

Step 804, the terminal device receives the inquiry request from the network device.

Step 806, the terminal device sends an inquiry feedback to the network device, where the inquiry feedback includes the indication information.

In one design, the inquiry request carries n first network signaling values, each of the first network signaling values is used to indicate a kind of additional out-of-band radiation requirement; the inquiry feedback carries n feedback information corresponding to the n first network signaling values, and the feedback information is an acknowledgement feedback or a negative acknowledgement feedback.

Figure 9:
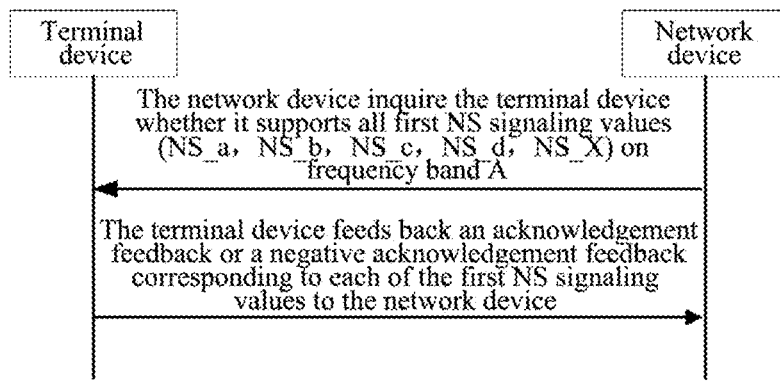
FIG. 9 is a flow chart of an information indicating method according to an exemplary embodiment of the present application.

As shown in FIG. 9, the network device inquires the terminal device whether it supports all first NS signaling values (NS_a, NS_b, NS_c, NS_d, NS_X) on frequency band A, and the terminal device feeds back an acknowledgement feedback or a negative acknowledgement feedback corresponding to each of the first NS signaling values to the network device. Exemplary, the acknowledgement feedback is a bit with a value of 1, and the negative acknowledgement feedback is a bit with a value of 0.

In another design, the inquiry request does not carry a second network signaling value, and the inquiry feedback carries m second network signaling values. Each of the second network signaling values is used to indicate an additional out-of-band radiation requirement supported by the terminal device.

Figure 10:
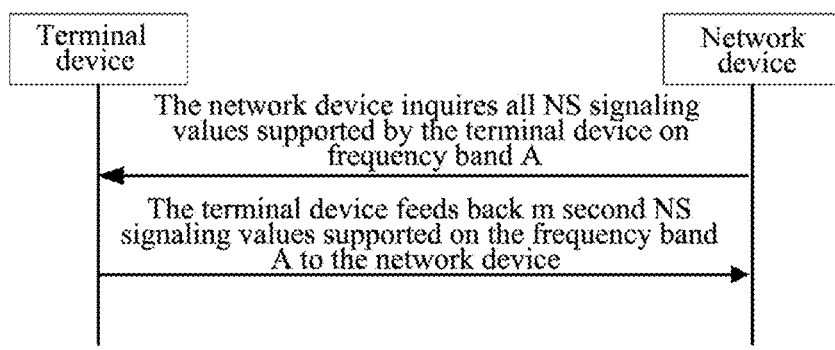
FIG. 10 is a flow chart of an information indicating method according to an exemplary embodiment of the present application.

As shown in FIG. 10, the network device inquires all NS signaling values supported by the terminal device on the frequency band A, and the terminal device feeds back m second NS signaling values supported on the frequency band A to the network device, such as (NS_a, NS_b, NS_c, NS_d, NS_X).

Step 808, the network device receives the inquiry feedback from the terminal device.

In an embodiment, the network device receives the inquiry feedback from the terminal device.

In an embodiment, the network device determines one or more additional out-of-band radiation requirements supported by the terminal device according to the inquiry feedback. The network device configures an accessible cell to the terminal device according to the one or more additional out-of-band radiation requirements supported by the terminal device.

That is, if the terminal device supports a corresponding frequency band and a network signaling value, the network device can continue to configure a corresponding carrier; if not, the network device will not configure the corresponding carrier.

In conclusion, in the method provided by the embodiment, the network device can actively inquire the terminal device about the additional out-of-band radiation requirement it supports, and there is no need to perform reporting for a terminal device that does not to be configured with a carrier or a cell, which reduces the amount of signaling that the network device needs to receive and saves air interface resources.

Figure 11:
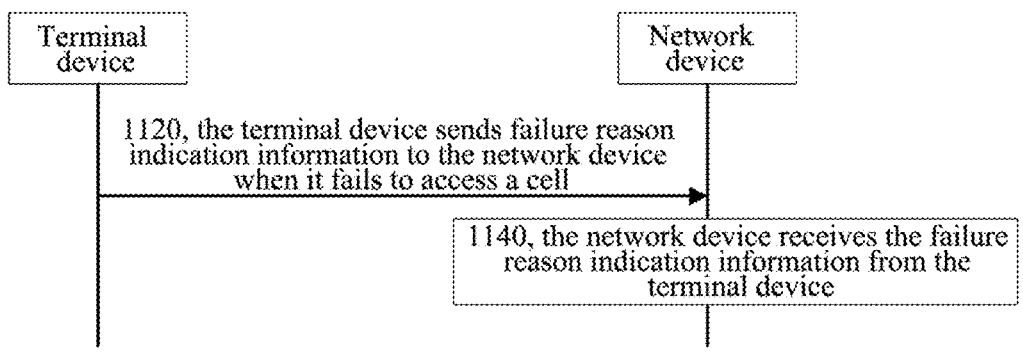
FIG. 11 is a flow chart of an information indicating method according to an exemplary embodiment of the present application.

For the above mode 3:

FIG. 11 shows a flow chart of an information indicating method according to an exemplary embodiment of the present application. This method can be applied to the communication system shown in FIG. 3. The method includes:

Step 1120, the terminal device sends failure reason indication information to the network device when it a cell access fails;

In the mode 3, the network device does not report network signaling value capability it supports at an initial access, and the network device does not inquiry terminal capability before configuring a secondary cell, so a secondary cell configuration failure may potentially occur.

For example, the network device configures frequency band A to the terminal, and a system of the cell belonging to the frequency band A broadcasts additional out-of-band radiation indications NS_a, NS_b, NS_c, NS_d, NS_X. The terminal device does not support the NS_X signaling value broadcasted on the frequency band A, and thus the cell is regarded as a bar state.

The terminal device reports a failure reason value of unable to access the cell to the base station, that is, it does not support the additional out-of-band radiation indication NS_X.

The failure reason indication information includes a failure reason value, which is used to indicate that the additional out-of-band radiation requirement is not supported by the terminal device.

Step 1140, the network device receives the failure reason indication information from the terminal device;

In an embodiment, the network device receives the failure reason indication information from the terminal device.

In an embodiment, the network device determines one or more additional out-of-band radiation requirements not supported by the terminal device according to the failure reason value in the failure reason indication information. The network device configures an accessible cell to the terminal device according to the one or more additional out-of-band radiation requirements not supported by the terminal device.

In conclusion, in the method provided in the embodiment, the terminal device only reports the failure reason value to the network device when the cell access fails, so that the terminal device without cell access failure does not need to report, which reduces the amount of signaling that the network device needs to receive and saves air interface resources.

Figure 12:
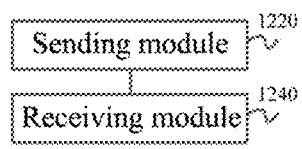
FIG. 12 is a block diagram of an information indicating apparatus according to an exemplary embodiment of the present application.

FIG. 12 shows a block diagram of an information indicating apparatus according to an exemplary embodiment of the present application. The apparatus includes a sending module 1220 and a receiving module 1240.

The sending module 1220 is configured to send indication information to a network device, where the indication information is used to indicate an additional out-of-band radiation requirement supported by the terminal device.

In an embodiment, the sending module 1220 is configured to send first indication information to the network device, where the first indication information includes a bitmap, and the bitmap is used to indicate the additional out-of-band radiation requirement supported by the terminal device.

In an embodiment, the first indication information is carried in a radio resource control RRC signaling.

In an embodiment, the sending module 1220 is configured to send second indication information to the network device, where the second indication information includes a document number and a full version number of a communication protocol, and the document number and the full version number of the communication protocol are used to indicate the additional out-of-band radiation requirement supported by the terminal device.

In an embodiment, the second indication information is carried in a wireless access capability of the terminal device.

In an embodiment, the sending module 1220 is configured to send third indication information to the network device, where there are k bits that are multiplexed in the third indication information, the k bits are bits used to indicate the additional out-of-band radiation requirement supported by the terminal device, and K is a positive integer.

In an embodiment, the k bits that are multiplexed in the third indication information include:

a first bit in a modified maximum power reduction MPR behavior signaling, where the first bit is used to indicate a bit used to indicate a modified maximum power reduction MPR behavior;

or, all or part of reserved bits in the modified maximum power reduction MPR behavior signaling, where the reserved bits are bits other than the first bit;

or, the first bit and all or part of the reserved bits in the modified maximum power reduction MPR behavior signaling.

In an embodiment, the receiving module 1240 is configured to receive an inquiry request from the network device, where the inquiry request is used to inquire about the additional out-of-band radiation requirement supported by the terminal device;

the sending module 1220 is configured to send an inquiry feedback to the network device, where the inquiry feedback includes the indication information.

In an embodiment, the inquiry request carries n first network signaling values, each of the first network signaling values is used to indicate a kind of additional out-of-band radiation requirement; the inquiry feedback carries n feedback information corresponding to the n first network signaling values, the feedback information is an acknowledgement feedback or a negative acknowledgement feedback, and N is a positive integer;

or, the inquiry feedback carries m second network signaling values, each of the second network signaling values is used to indicate a kind of additional out-of-band radiation requirement supported by the terminal device, and M is a positive integer.

In an embodiment, the sending module 1220 is configured to send failure reason indication information to the network device when a cell access fails, where the failure reason indication information includes a failure reason value, and the failure reason value is used to indicate an additional out-of-band radiation requirement that is not supported by the terminal device.

Figure 13:
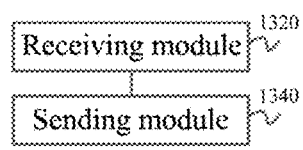
FIG. 13 is a block diagram of an information indicating apparatus according to an exemplary embodiment of the present application.

FIG. 13 shows a block diagram of an information indicating apparatus according to an exemplary embodiment of the present application. The device includes a receiving module 1320 and a sending module 1340.

The receiving module 1320 is configured to receive indication information from a terminal device, where the indication information is used to indicate an additional out-of-band radiation requirement supported by the terminal device.

In an embodiment, the receiving module 1320 is configured to receive first indication information from the terminal device, where the first indication information includes a bitmap, and the bitmap is used to indicate the additional out-of-band radiation requirement supported by the terminal device.

In an embodiment, the first indication information is carried in an RRC signaling.

In an embodiment, the receiving module 1320 is configured to receive second indication information from the terminal device, where the second indication information includes a document number and a full version number of a communication protocol, and the document number and the full version number of the communication protocol are used to indicate the additional out-of-band radiation requirement supported by the terminal device.

In an embodiment, the second indication information is carried in a wireless access capability of the terminal device.

In an embodiment, the receiving module 1320 is configured to receive third indication information from the terminal device, where there are k bits that are multiplexed in the third indication information, the k bits are bits used to indicate the additional out-of-band radiation requirement supported by the terminal device, and K is a positive integer.

In an embodiment, the k bits that are multiplexed in the third indication information include:
- a first bit in a modified maximum power reduction MPR behavior signaling, where the first bit is used to indicate a bit used to indicate a modified maximum power reduction MPR behavior;
- or, all or part of reserved bits in the modified maximum power reduction MPR behavior signaling, where the reserved bits are bits other than the first bit;
- or, the first bit and all or part of the reserved bits in the modified maximum power reduction MPR behavior signaling.

In an embodiment, the sending module 1340 is configured to send an inquiry request to the terminal device, where the inquiry request is used to inquire about the additional out-of-band radiation requirement supported by the terminal device;
the receiving module 1320 is configured to receive an inquiry feedback from the terminal device, where the inquiry feedback includes the indication information.

In an embodiment, the inquiry request carries n first network signaling values, each of the first network signaling values is used to indicate a kind of additional out-of-band radiation requirement; the inquiry feedback carries n feedback information corresponding to the n first network signaling values, the feedback information is an acknowledgement feedback or a negative acknowledgement feedback, and n is a positive integer;
or,
the inquiry feedback carries m second network signaling values, each of the second network signaling values is used to indicate a kind of additional out-of-band radiation requirement supported by the terminal device, and m is a positive integer.

In an embodiment, the receiving module 1320 is configured to receive failure reason indication information from the terminal device, where the failure reason indication information includes a failure reason value of the terminal device when a cell access fails, and the failure reason value is used to indicate an additional out-of-band radiation requirement that is not supported by the terminal device.

Figure 14:
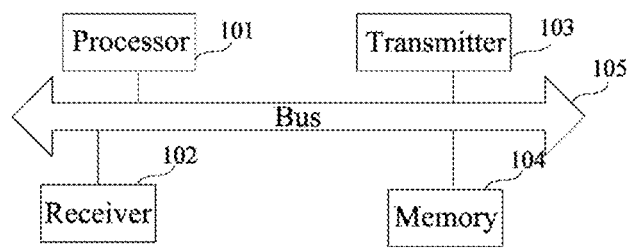
FIG. 14 is a schematic structural diagram of a communication device according to an exemplary embodiment of the present application.

FIG. 14 shows a schematic structural diagram of a communication device (a network device or a terminal device) according to an exemplary embodiment of the present application, which includes a processor 101, a receiver 102, a transmitter 103, a memory 104 and a bus 105.

The processor 101 includes one or more processing cores. The processor 101 executes various functional applications and information processing by running software programs and modules.

The receiver 102 and the transmitter 103 may be implemented as a communication component, which may be a communication chip.

The memory 104 is connected to the processor 101 via the bus 105.

The memory 104 may be used to store at least one instruction, and the processor 101 may be used to execute the at least one instruction to implement the steps in the above method embodiment.

In addition, the memory 104 may be implemented by any type of volatile or non-volatile storage device or a combination thereof, including but not limited to: a magnetic disk or an optical disk, an Erasable Programmable Read Only Memory (EEPROM), an erasable programmable read only memory (EPROM), a Static Random Access Memory (SRAM), a Read-Only Memory (ROM), a magnetic memory, a flash memory, and a Programmable Read-Only Memory (PROM).

In an exemplary embodiment, a computer-readable storage medium is further provided. The computer-readable storage medium stores at least one instruction, at least one program, a code set or an instruction set, and the at least one instruction, at least one program, a code set or an instruction set are loaded and executed by a processor to implement the information indicating method executed by the terminal device or the information indicating method executed by the network device provided by the above method embodiments.

Those of ordinary skill in the art can understand that that all or part of the steps to implement the above embodiments can be completed by a hardware, or by a program to instruct a relevant hardware to complete, the program can be stored in a computer-readable storage medium, and the storage medium mentioned above can be a Read-Only Memory, a magnetic disk or an optical disk, etc.

The above is only embodiments of the present application and is not intended to limit the present application. Any modification, equivalent replacement, improvement, etc. made within the spirit and principle of the present application shall be included in the protection scope of the present application.

What is claimed is:

1. An information indicating method, comprising:
sending, by a terminal device, indication information to a network device, wherein the indication information is used to indicate additional spectrum emission supported by the terminal device;
wherein the sending, by a terminal device, indication information to a network device comprises:
sending, by the terminal device, third indication information to the network device, wherein there are k bits that are multiplexed in the third indication information, the k bits are bits used to indicate the additional spectrum emission supported by the terminal device, and K is a positive integer;
wherein the k bits that are multiplexed in the third indication information comprise:
a first bit in a modified maximum power reduction (MPR) behavior signaling, wherein the first bit is used to indicate a bit used to indicate a modified maximum power reduction (MPR) behavior;

or, all or part of reserved bits in the modified maximum power reduction (MPR) behavior signaling, wherein the reserved bits are bits other than the first bit;

or, the first bit and all or part of the reserved bits in the modified maximum power reduction (MPR) behavior signaling.

2. The method according to claim 1, wherein the indication information comprises a Network Signaling (NS) value supported by the terminal device.

3. The method according to claim 1, wherein the sending, by a terminal device, indication information to a network device comprises:
sending, by the terminal device, first indication information to the network device, wherein the first indication information comprises a bitmap, and the bitmap is used to indicate the additional spectrum emission supported by the terminal device.

4. The method according to claim 3, wherein the bitmap comprises 8 bits.

5. The method according to claim 3, wherein the first indication information is carried in a radio resource control (RRC) signaling.

6. The method according to claim 1, further comprising:
receiving first configuration information sent by the network device, wherein the first configuration information is used to indicate an accessible cell of the terminal device, the accessible cell is determined according to the additional spectrum emission supported by the terminal device.

7. An information indicating method, comprising:
receiving, by a network device, indication information from a terminal device, wherein the indication information is used to indicate additional spectrum emission supported by the terminal device;
wherein the receiving, by a network device, indication information from a terminal device comprises:
receiving, by the network device, third indication information from the terminal device, wherein there are k bits that are multiplexed in the third indication information, the k bits are bits used to indicate the additional spectrum emission supported by the terminal device, and K is a positive integer;
wherein the k bits that are multiplexed in the third indication information comprise:
a first bit in a modified maximum power reduction (MPR) behavior signaling, wherein the first bit is used to indicate a bit used to indicate a modified maximum power reduction (MPR) behavior;
or, all or part of reserved bits in the modified maximum power reduction (MPR) behavior signaling, wherein the reserved bits are bits other than the first bit;
or, the first bit and all or part of the reserved bits in the modified maximum power reduction (MPR) behavior signaling.

8. The method according to claim 7, wherein the indication information comprises a Network Signaling (NS) value supported by the terminal device.

9. The method according to claim 7, wherein the receiving, by a network device, indication information from a terminal device comprises:
receiving, by the network device, first indication information from the terminal device, wherein the first indication information comprises a bitmap, and the bitmap is used to indicate the additional spectrum emission supported by the terminal device.

10. The method according to claim 9, wherein the first indication information is carried in a radio resource control (RRC) signaling.

11. The method according to claim 7, further comprising:
configuring, by the network device, an accessible cell to the terminal device according to the additional spectrum emission requirement supported by the terminal device.

12. An information indicating apparatus, comprising:
a transceiver, configured to receive indication information from a terminal device, wherein the indication information is used to indicate additional spectrum emission supported by the terminal device;
wherein the transceiver is configured to receive third indication information from the terminal device, wherein there are k bits that are multiplexed in the third indication information, the k bits are bits used to indicate the additional spectrum emission supported by the terminal device, and K is a positive integer;
wherein the k bits that are multiplexed in the third indication information comprise:
a first bit in a modified maximum power reduction (MPR) behavior signaling, wherein the first bit is used to indicate a bit used to indicate a modified maximum power reduction (MPR) behavior;
or, all or part of reserved bits in the modified maximum power reduction (MPR) behavior signaling, wherein the reserved bits are bits other than the first bit;
or, the first bit and all or part of the reserved bits in the modified maximum power reduction (MPR) behavior signaling.

13. The apparatus according to claim 12, wherein the indication information comprises a Network Signaling (NS) value supported by the terminal device.

14. The apparatus according to claim 12, wherein the transceiver is configured to receive first indication information from the terminal device, wherein the first indication information comprises a bitmap, and the bitmap is used to indicate the additional spectrum emission supported by the terminal device.

15. The apparatus according to claim 14, wherein the bitmap comprises 8 bits.

16. The apparatus according to claim 14, wherein the first indication information is carried in an (RRC) signaling.

17. The apparatus according to claim 12, further comprising:
a processor, configured to configure an accessible cell to the terminal device according to the additional spectrum emission requirement supported by the terminal device.

* * * * *